(12) United States Patent
Natkin

(10) Patent No.: US 8,001,473 B1
(45) Date of Patent: Aug. 16, 2011

(54) METHODS AND SYSTEMS FOR GENERATING A COMPOSITION

(75) Inventor: Michael Natkin, Seattle, WA (US)

(73) Assignee: Adobe Systems Incorporated, San Jose, CA (US)

(*) Notice: Subject to any disclaimer, the term of this patent is extended or adjusted under 35 U.S.C. 154(b) by 619 days.

(21) Appl. No.: 12/016,689

(22) Filed: Jan. 18, 2008

(51) Int. Cl.
*G06F 3/00* (2006.01)

(52) U.S. Cl. .................. 715/723; 345/467; 345/473

(58) Field of Classification Search .......... 345/440–475, 345/581–689; 715/723–726
See application file for complete search history.

(56) References Cited

U.S. PATENT DOCUMENTS

| | | | | |
|---|---|---|---|---|
| 5,579,054 A * | 11/1996 | Sezan et al. | ............ | 348/452 |
| 6,088,510 A * | 7/2000 | Sims | ............ | 706/13 |
| 6,918,098 B2 * | 7/2005 | Smith et al. | ............ | 716/4 |
| 7,835,998 B2 * | 11/2010 | Aravamudan et al. | ............ | 706/11 |
| 2003/0234806 A1 * | 12/2003 | Toyama et al. | ............ | 345/723 |
| 2007/0150471 A1 * | 6/2007 | MacGregor | ............ | 707/6 |

OTHER PUBLICATIONS

Bain, Steven, "*Create Classic Masterpieces in Corol PHOTO-PAINT®,*" http://www.corel.com/servlet/Satellite/us/en/Content/1153321232068, Feb. 17, 2007, pp. 1-13.
Pound, John, "*About Random Computer-Generated Comics,*", http://www.poundart.com/art/randcomix/about.html, Apr. 18, 2001, pp. 1-9.
Sims, Karl, "*Genetic Images*," http://www.genarts.com/karl/genetic-images.html, Mar. 5, 2000, pp. 1-4.

\* cited by examiner

*Primary Examiner* — Nicholas D Lucchesi
*Assistant Examiner* — Gerald Landry, II
(74) *Attorney, Agent, or Firm* — Kilpatrick Townsend & Stockton LLP

(57) ABSTRACT

Certain embodiments of the present invention provide methods and systems for generating a plurality of adjusted compositions by modifying selected properties of a first composition at random. In one embodiment, a first composition having a plurality of properties is received. A selection of one or more properties is received. A randomness value is received. A set of adjusted compositions is generated based in part on the first composition, selected one or more properties, and the randomness value. At least a subset of the set of adjusted compositions is outputted, such as displayed to a user.

27 Claims, 11 Drawing Sheets

METHODS AND SYSTEMS FOR GENERATING A COMPOSITION

FIELD OF THE INVENTION

The present invention relates generally to composition processing and more particularly to generating a composition by randomly changing selected composition properties.

BACKGROUND

A composition can include a digital image, series of images forming a moving picture, one or more keyframes and any intervening frames, an animation, or any visual presentation having pixels. Compositions may be viewed, developed, and modified using a software application. Users may generate or edit a composition by modifying a property associated with one or more composition pixels. For example, users may utilize a software application to identify composition pixels to modify and select a property of the pixels, such as color, to change. The software application changes the pixels in accordance with the user's selections and displays the modified composition to the user for review.

Compositions and composition pixels may include thousands (if not more) of properties that the user can cause to be modified. Often, users modify various properties and review many different compositions where each includes a different combination of property changes before completing an edit session. However, compositing applications may require a user to change and review several different combinations of modified properties until the user identifies a final composition. Furthermore, the user may be required to come up with or generate various combinations of property modifications to generate and review many different composition presentations from which to select a final composition. Accordingly, a need exists for a tool that can be used to decrease the time required to generate a number of different compositions, each having a different combination of properties.

SUMMARY

Certain embodiments of the present invention provide methods and systems for generating a plurality of adjusted compositions. One embodiment is a method for generating the plurality of adjusted compositions. A first composition having properties is received. A selection of one or more of the properties is received. A randomness value is received. A set of adjusted compositions is generated based on at least the first composition, selected one or more properties, and the randomness value. At least a subset of the set of adjusted compositions is outputted, where the subset can be viewed by a user. In some embodiments, one or more of the adjusted compositions in the set of adjusted compositions can be selected and used to generate a subsequent set of adjusted compositions.

One embodiment of the present invention is a system for generating a plurality of adjusted compositions. An output device is provided that is adapted to display a user interface. An input device is provided that is adapted to receive user inputs and provide the user inputs to a processor-based device. The user inputs can include a selection of one or more composition properties and a randomness value. The processor-based device can include an application having a randomization engine and a first composition. The randomization engine may be adapted to generate a set of adjusted compositions based at least on the first composition, selected properties, and the randomness value. The randomization engine may also be adapted to output at least a subset of the set of adjusted compositions to the output device, where a user may view them.

These embodiments are mentioned not to limit or define the invention, but to provide examples of embodiments of the invention to aid understanding thereof. Embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide methods and systems for generating a set of adjusted compositions from a first composition by modifying at least one selected property using randomization. A final composition can be selected from the set of adjusted compositions. In one illustrative embodiment, a first composition is received or created. The first composition may be an image having one or more properties such as color, line width, object position, number of objects, and image motion speed. The properties may be associated with composition pixels, layers, or any other component that forms the composition. A randomization value and a selection of one or more properties to change may be received. A set of adjusted compositions can be generated by randomly modifying the selected properties of the first composition based on the randomization value. The randomization value may be modified to produce more or less variations in the set of adjusted compositions. At least part of the set of the adjusted compositions may be displayed to the user. In some embodiments, one or more of the plurality of adjusted compositions may be selected and a new set of adjusted compositions generated based on the selected adjusted compositions.

Compositions according to some embodiments of the present invention can include images, a set of images that form a moving picture, one or more keyframes and any intervening frames, animations, or any visual presentation having pixels and/or layers. The compositions may include one or more objects that are represented using pixels having various properties. A first composition may be any type of composition and can be received from any source or created by a user via a software application. Examples of sources include a digital camera, a digital video camera, the Internet, magnetic disk, and an image scanner.

Illustrative System Implementation

Figure 1:
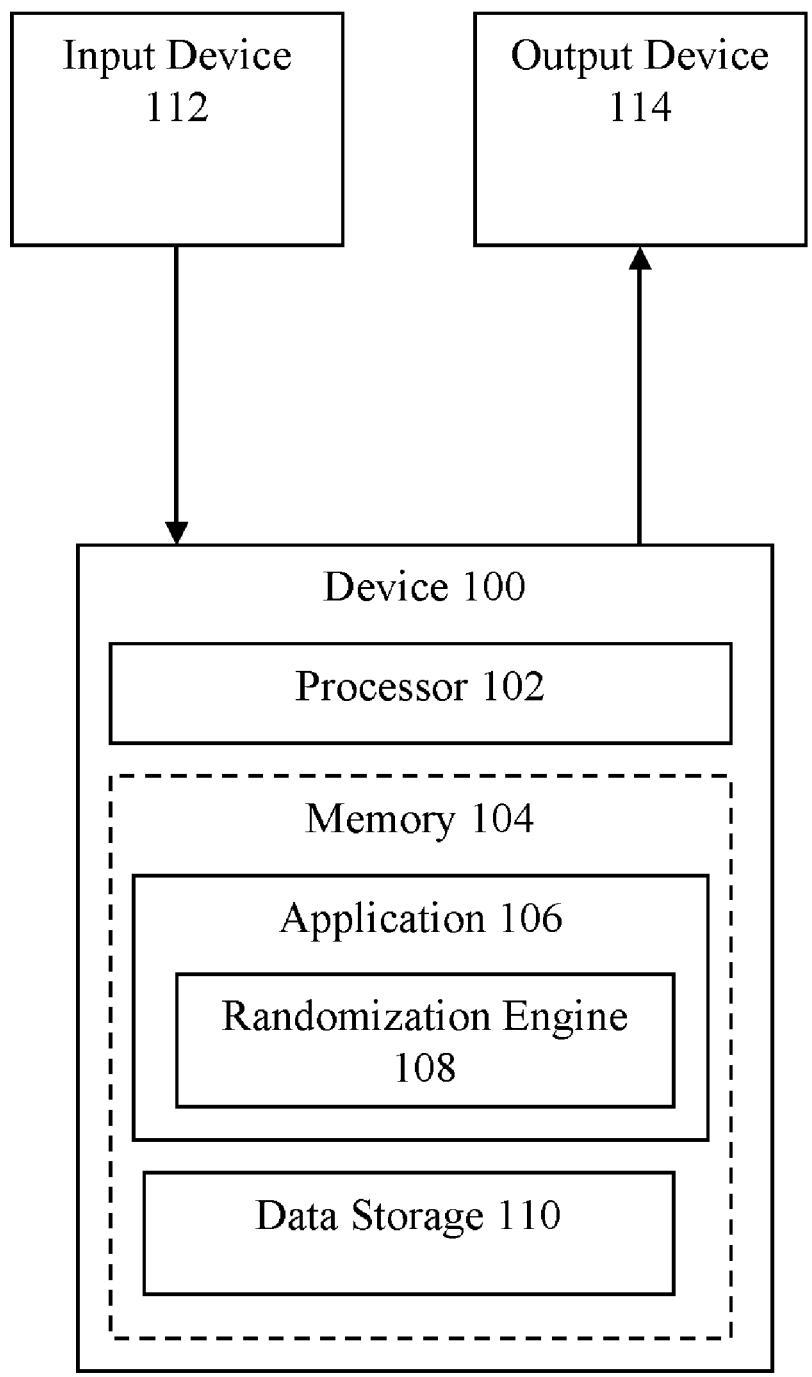
FIG. 1 is a system diagram illustrating a composition generation system according to one embodiment of the present invention.

Methods according to various embodiments of the present invention may be implemented on a variety of different systems. An example of one such system is illustrated in FIG. 1. The system includes a processor-based device 100 that includes a processor 102 and a computer-readable medium, such as memory 104. The device 100 may be any type of processor-based device, examples of which include a computer and a server. Memory 104 may be adapted to store computer-executable code and data. Computer-executable code may include an application 106, such as a composition editor program, that can be used to create, analyze, and edit compositions. The application 106 may include a randomization engine 108 that, as described in more detail below, may be adapted to perform methods according to various embodiments of the present invention to generate a composition. In some embodiments, the randomization engine 108 may be a separate application that is executable separate from, and optionally concurrent with, application 106.

Memory 104 may also include a data storage 110 that is adapted to store data generated by the application 106 or randomization engine 108, or input by a user. In some embodiments, data storage 110 may be separate from device 100, but connected to the device 100 via wire line or wireless connection.

The device 100 may be in communication with an input device 112 and an output device 114. The input device 112 may be adapted to receive user input or compositions and communicate the user input or compositions to the device 100. Examples of input device 112 include a keyboard, mouse, scanner, and network connection. User inputs can include commands that cause the processor 102 to execute various functions associated with the application 106 or the randomization engine 108. The output device 114 may be adapted to provide data or visual output from the application 106 or the randomization engine 108. In some embodiments, the output device 114 can display a visual representation of a composition and a plurality of compositions and provide a graphical user interface (GUI) that includes one or more selectable buttons that are associated with various functions provided by the application 106 or the randomization engine 108. Examples of output device 114 include a monitor, network connection, and printer.

Illustrative Methods for Generating an Adjusted Composition Set

Figure 2:
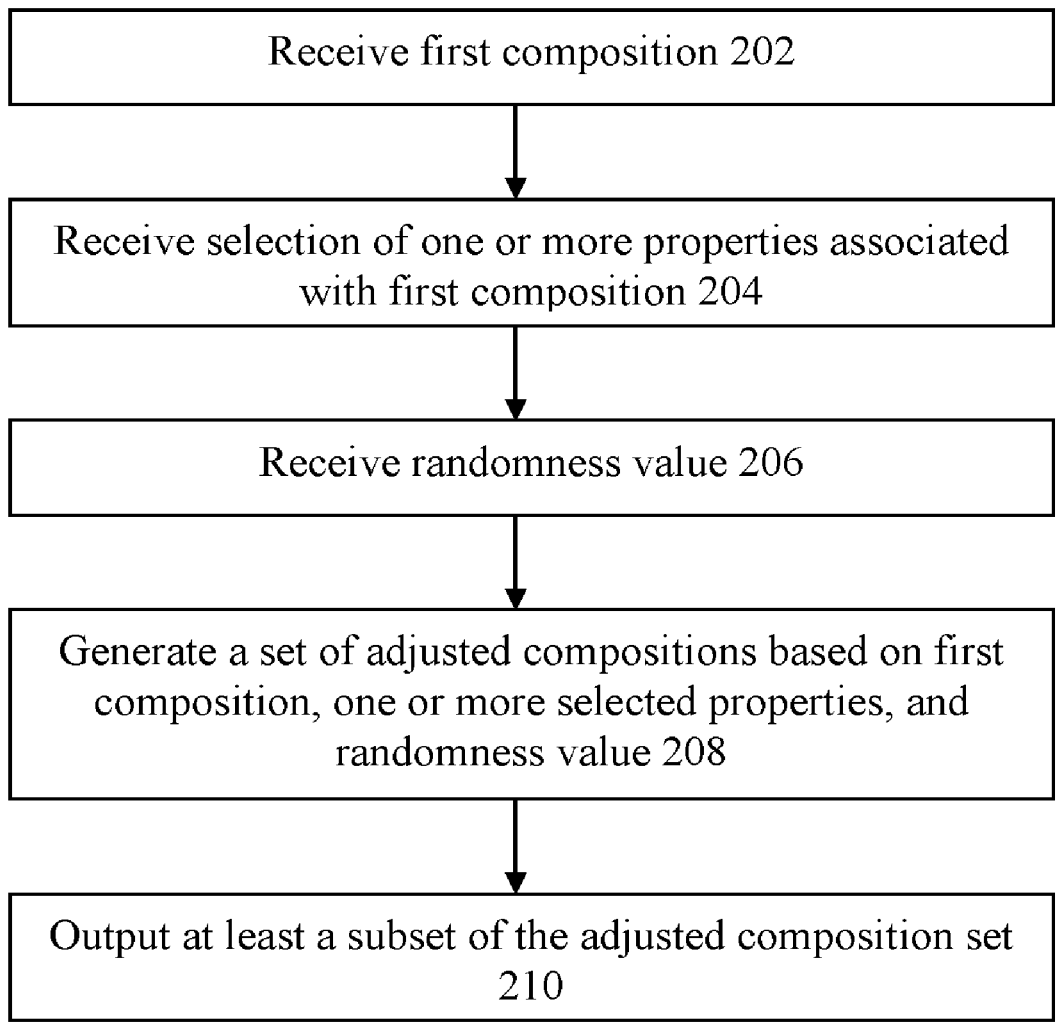
FIG. 2 is a flow chart illustrating one method for generating a composition according to one embodiment of the present invention.

Various methods according to various embodiments of the present invention can be used to generate a composition based on a first composition. FIG. 2 illustrates one embodiment of a method to generate a set of adjusted compositions based on a first composition. For purposes of illustration only, the elements of this method are described with references to the system depicted in FIG. 1 and flow charts shown in FIGS. 3-4. A variety of other implementations is possible.

In block 202, the processor-based device 100 receives a first composition. The first composition may be any visual presentation having pixels. Examples of first compositions include images, a set of images that form a moving picture, one or more keyframes and any intervening frames, and animations. The first composition may be created using tools provided by application 106 or provided to the processor-based device 100 from input device 112. For example, the first composition may be uploaded from a digital camera or scanner or sent from a remote device over a network to the processor-based device 100. In some embodiments, a composition may be provided to the processor-based device 100 from input device 112 and then edited to create a first composition from which the user wishes to generate a set of adjusted compositions. The first composition can be stored in data storage 110 or in a temporary memory location within the processor-based device 100. The randomization engine 108 can subsequently access the first composition for further processing in accordance with various embodiments of the present invention.

In block 204, the randomization engine 108 receives a selection of one or more properties associated with the first composition. The one or more properties may be any property associated with the first composition or first composition pixels. Examples of properties include color, line width, shape, shading, sharpness, object size, and moving picture speed. The selection of one or more properties may be received from a user input. For example, the randomization engine 108 may output one or more properties to the output device 114 to allow a user to select the one or more properties using input device 112 or the randomization engine 108 may receive an input via input device 112 identifying one or more properties to select. In some embodiments, the randomization engine 108 automatically identifies of one or more properties to select. For example, the randomization engine 108 may select properties based on a pre-set identification of properties to select or by detecting preferred properties based on previous edit sessions. The randomization engine 108 may monitor edit sessions to identify preferred properties as those properties that the user modifies most often. In some embodiments, the randomization engine 108 randomly identifies one or more properties associated with the first composition to select.

In block 206, the randomization engine 108 receives a randomness value. In some embodiments, the user may input a randomness value via input device 112 that is received by the randomization engine 108. In other embodiments, the randomization engine 108 automatically generates a randomness value. For example, the randomization engine 108 may be configured to use a default randomness value or monitor previous adjusted composition generation sessions and generate a randomness value most often used. The randomness value may be a number within a pre-set range that can be used to determine a level of variety of adjusted compositions within a set of adjusted composition. For example, the randomness value may be a percentage between 0% and 100%, where 0% indicates no to very little variety and 100% indicates full randomization and variety. Other examples of the randomness value include a number between a pre-set range, such as zero and ten, or a letter within a pre-set range, such as A to F. As explained in more detail below, the randomness value can be used to determine the variety of adjusted compositions by determining the range of property attributes from the selected properties used to generate the adjusted compositions.

In block 208, the randomization engine 108 generates a set of adjusted compositions based on the first composition, one or more selected properties, and the randomness value. The set of adjusted compositions can include one adjusted composition or a plurality of adjusted compositions. The randomization engine 108 can modify the first composition by changing one or more selected properties each time it creates an adjusted composition to include in the set. The randomization engine 108 uses the randomness value to determine property attributes with which to change the one or more selected properties for each adjusted composition in the set. The randomization engine 108 generates the set of adjusted compositions by modifying the one or more selected properties using the randomness value for one or more adjusted composition until a set of adjusted compositions is complete. A set of adjusted compositions may include a pre-set number of adjusted compositions. In some embodiments, the randomization engine 108 receives a number of adjusted compositions to include in the set.

Once the set of adjusted compositions is complete, the randomization engine 108 may output at least a subset of the set of adjusted compositions to the output device 114 in block 210. For example, the randomization engine 108 may output the entire set of adjusted compositions or a pre-set number of adjusted compositions within the set to an output device 114. The output device 114 may be a display device that includes a graphical user interface for displaying the subset. The user may review the outputted subset of adjusted compositions and, as explained in more detail below, cause the randomization engine 108 to perform further processing in accordance with various embodiments of the present invention.

Figure 4:
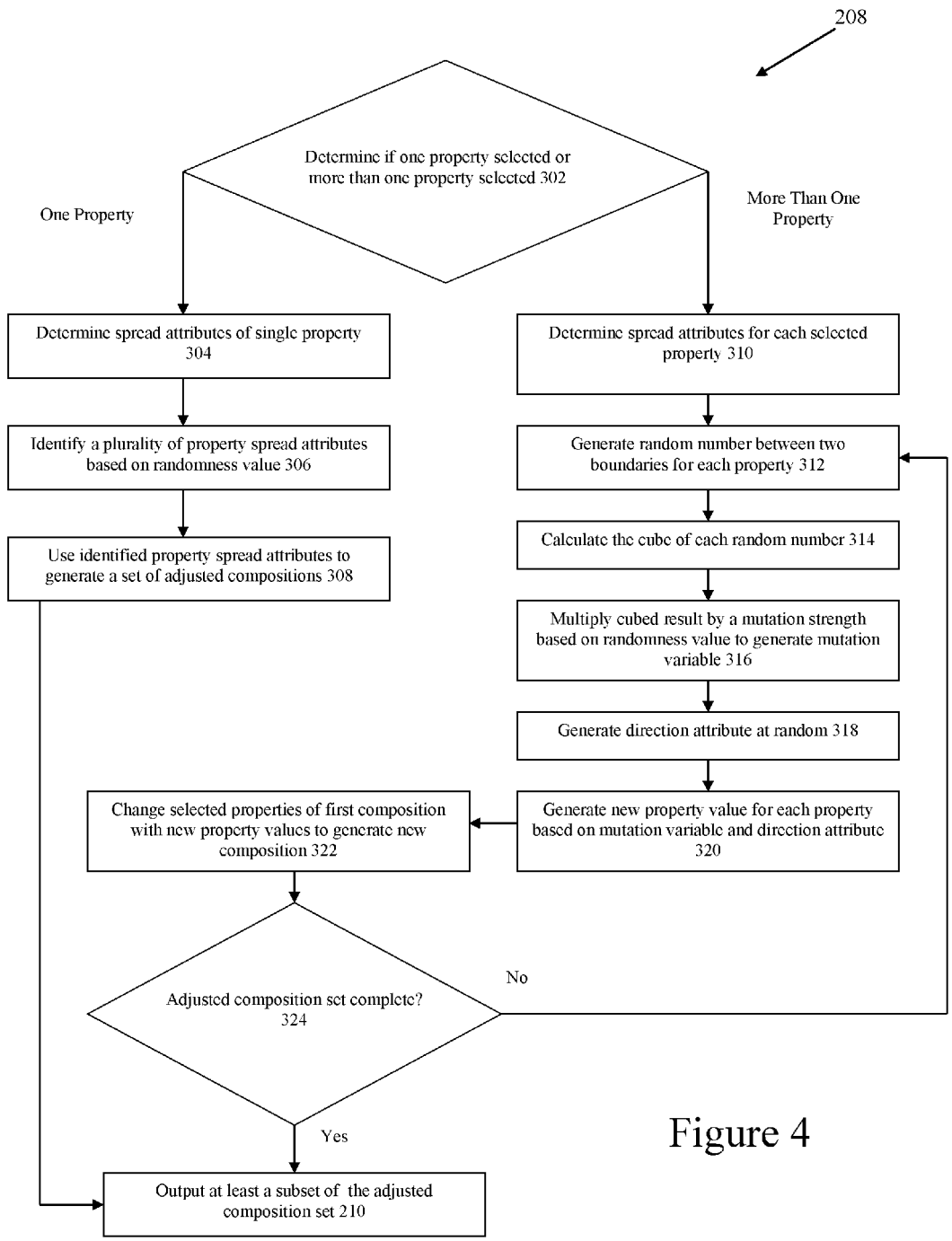
FIG. 4 is a flow chart illustrating one method for generating a composition based on a number of properties selected according to one embodiment of the present invention.

The randomization engine 108 may use various techniques to generate an adjusted composition set in block 208. One such technique is illustrated in FIG. 4. The technique may begin in block 302 when the randomization engine 108 determines if the selected one or more property includes one property or more than one property. For example, the randomization engine 108 may receive the selection of the one or more properties and identify each property selected to determine if one property was selected or more than one property was selected.

If only one property was selected, the randomization engine 108 determines spread attributes of the selected property in block 304. The spread attributes may be a minimum and maximum value for the property selected. For example, the spread attributes for the property of blue color may be a minimum of very light blue, such as a mostly white color mixed with a small bit of blue color, and a maximum of very dark blue, such as almost black coloring.

Determination of spread attributes for a property may depend on the particular property or type of property selected. Each property may require different methods to identify a minimum and maximum values for spread attributes of the particular property. For example, a minimum value for the property of basic color may correspond to a red-green-blue (RGB) value of 0 and a maximum value may correspond to an RGB value of 255. A minimum value for the property of high dynamic range (HDR) color may correspond to an RGB value of 0 and a maximum value may correspond to an RGB value of 512. The spread attributes of the property of rotation may be −712° to 712° of rotation.

Some properties may not include a minimum and/or maximum value. For example, a radius of a Gaussian blur filter has a minimum of zero, but no fixed maximum value. Spread attributes for some such properties may be determined using an original value and a current value of the property. The current value may be the value associated with the first composition. The original value may be the value associated with the property in its original state, before modifications to fit it within a composition. A minimum value may be determined by subtracting an attribute variable from the absolute of the original value. The attribute variable may be determined by multiplying the absolute of the current value by three. In some embodiments, ten is used for the attribute variable if the determination of the attribute variable results in a number less than ten. The maximum value may be determined by adding the attribute variable to the absolute of the original value.

Some properties may include spread attributes that are not determinable with the above techniques. An example of one such property is the roundness of a line or other composition object. The spread attributes for such properties may be determined using a scale, such as a percentage-based scale. For example, a minimum spread attribute value for roundness may be identified as a straight line or 0% and a maximum spread attributed may be identified as a 180° curve or 100%. The minimum and maximum spread attributes may define a range within which particular property attributes may be identified.

In block 306, the randomization engine 108 identifies one or more spread attributes of the property using the randomness value. The identified spread attributes may be different property attributes between the minimum and maximum spread attributes. In some embodiments, the identified spread attributes may include the minimum and/or maximum spread attributes. The randomization engine 108 may use the randomness value to determine the distance between the identified spread attributes. For example, if the randomness value is relatively high, the randomization engine 108 may identify spread attributes that are far apart from each other within the range defined by the minimum and maximum spread attributes. Furthermore, the randomization engine 108 may identify spread attributes far from the current property attribute of the first composition if the randomness value is relatively high. If the randomness value is relatively low, the randomization engine 108 may identify spread attributes that are relatively close together within the range defined by the minimum and maximum spread attributes or relatively close to the current property attribute of the first composition.

The number of identified spread attributes may depend on the number of adjusted compositions that the randomization engine 108 generates. For example, the randomization engine 108 may identify nine spread attributes to generate nine adjusted compositions. In some embodiments, the randomization engine 108 generates an adjusted composition to include in the set using two or more identified spread attributes.

In block 308, the randomization engine 108 generates a set of adjusted compositions using the identified spread attributes of the property. Each adjusted composition can be generated by changing the selected property to one or more identified spread attributes of the property. In some embodiments, the randomization engine 108 generates one adjusted composition for each identified spread attribute. In other embodiments, the randomization engine 108 generates one adjusted composition by including two or more identified spread attributes. Adjusted compositions may be generated until a set of adjusted compositions is complete. A set of adjusted compositions may include any number of adjusted compositions, including one adjusted composition.

Once a set of adjusted compositions is generated, the randomization engine 108 may output at least a subset of the adjusted compositions in block 210. The subset of adjusted compositions may include the entire set of adjusted compositions or a number of adjusted compositions that is less than the entire set of adjusted compositions. The process may be repeated and further adjusted composition sets may be generated with or without changes to the selected properties or randomness value.

In some embodiments, the randomization engine 108 may receive a selection of more than one property from which to generate adjusted compositions. Upon detecting that more than one property is selected in block 302, the randomization engine 108 may determine spread attributes for each selected property in block 310. The spread attributes may include identifying a minimum property value and a maximum property value for each selected property. Determination of the minimum property value and maximum property value may be similar to the spread attributes determination discussed above with reference to block 304. The minimum and maximum property values for each selected property may be determined using the same or different techniques, depending on the particular property selected, as described with reference to block 304.

In block 312, the randomization engine 108 generates a random number between two boundaries for each property selected. The random number may be generated using a random number generator that is configured to generate a number between the two boundaries. In some embodiments of the present invention, the two boundaries are set at 0 and 1 and the random number is a number between 0 and 1.

In block 314, the randomization engine 108 calculates a cube of each random number. For example, the randomization engine 108 multiplies each random number by itself three times to calculate the cube of each random number and determine a cubed result.

In block 316, the randomization engine 108 multiplies the cubed result by a mutation strength that is based on the randomness value to generate a mutation variable for each selected property. In some embodiments, the mutation strength is the same as the randomness value. For example, if the randomness value is 50%, the mutation strength may be 0.50. In other embodiments, the randomness value is converted to a different scale to determine the mutation strength. For example, a randomness value of 50% may be converted to scale having values between 0 and 10 such that the mutation strength is 5. The cubed result is then multiplied by the mutation strength to determine a mutation variable.

In block 318, the randomization engine 108 generates a direction attribute at random for each selected property. The direction attribute may be an "up" or "down" corresponding to a direction on the spread attributes range in which to change the selected property. For example, a 1 may represent the direction of up relative to the current property value and 0 may represent the direction of down relative to the current property value. In some embodiments, the randomization engine 108 uses a random number generator to generate a value representing an up or a down.

In block 320, the randomization engine 108 generates a new property value for each selected property based on the mutation variable and direction attribute. The direction attribute may determine how the new property value is determined for each selected property. For example, if the direction attribute represents a direction of "up," the following relationship may be used to determine the new property value:

$$NV=CV+\alpha(max-CV)$$

Where:
NV is the new property value;
CV is the current property value;
α is the mutation variable; and
max is the maximum spread attribute.

If the direction attribute represents a direction of "down," the new property value may determined using the following relationship:

$$NV=CV-\alpha(CV-min)$$

Where:
NV is the new property value;
CV is the current property value;
α is the mutation variable; and
min is the minimum spread attribute.

After a new property value is determined for each selected property, the randomization engine 108 changes the selected properties of the first composition with the new property values to generate an adjusted composition in block 322. The adjusted composition is generated based on the first composition, but selected properties are changed based on the selected randomness value by replacing the selected properties with the new property values.

In block 324, the randomization engine 108 determines if an adjusted composition set is complete. In some embodiments, an adjusted composition set is complete if a pre-set number of adjusted compositions are generated. If the randomization engine 108 determines that the adjusted composition set is incomplete, the adjusted composition is saved in data storage 110 and the process returns to block 312 to begin generating another adjusted composition. If the randomization engine 108 determines that the adjusted composition set is complete, the randomization engine 108 outputs at least a subset of the adjusted composition set in block 210. For example, the subset of adjusted compositions may be provided to the output device 114 that includes a display adapted to allow a user to view the subset of adjusted compositions.

Illustrative Methods for Further Processing Adjusted Compositions

Figure 3:
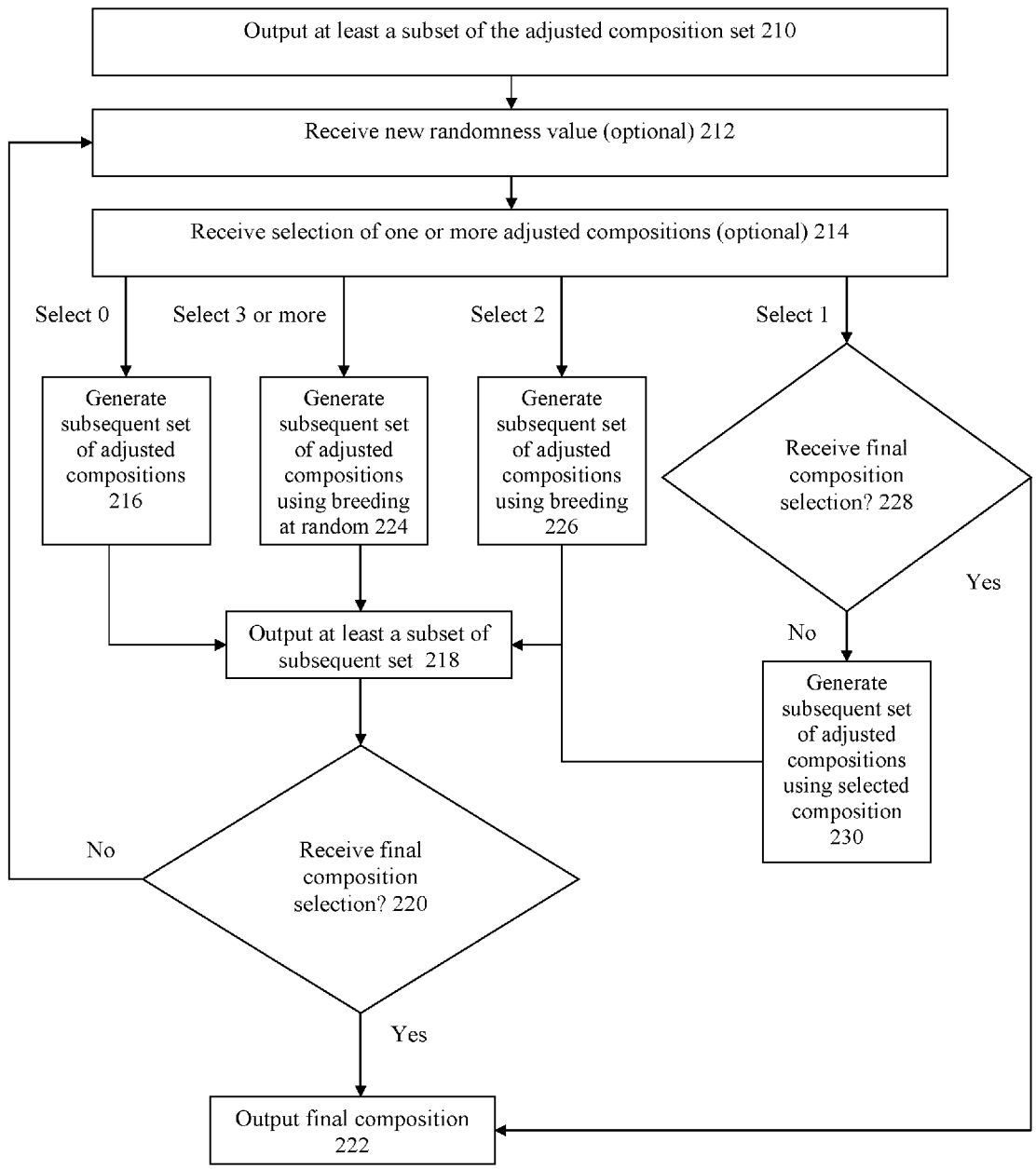
FIG. 3 is a flow chart illustrating one method for receiving a final composition selection according to one embodiment of the present invention.

In some embodiments of the present invention, the randomization engine 108 may be used to perform further processing methods. A user may wish to continue generating adjusted compositions using one or more of the adjusted compositions or select an adjusted composition as a final composition. FIG. 3 illustrates a flow chart for implementing these options. The process may begin when the randomization engine 108 outputs the subset of adjusted compositions in block 210 from FIG. 1.

In block 212, the randomization engine 108 may optionally receive a new randomness value. For example, the user may select a different randomness value than that used to generate the adjusted composition set. In some embodiments, the randomness value is not changed.

In block 214, the randomization engine 108 optionally receives a selection of one or more adjusted compositions. For example, the user may use the user input device 112 to select one or more adjusted compositions displayed on a graphical user interface associated with output device 114. In some embodiments, the randomization engine 108 does not receive a selection of any of the adjusted compositions. The next steps depend on whether the randomization engine 108 receives a selection of one or more adjusted compositions and the number of adjusted compositions selected.

If the randomization engine 108 does not receive a selection of an adjusted composition, the randomization engine 108 generates a subsequent set of adjusted compositions in block 216. The subsequent set of adjusted compositions may be generated in accordance with any method, one of which is described above with reference to FIG. 4 using the randomness value, selected one or more properties, and randomness value. The randomization engine 108 may output at least a subset of the subsequent set of adjusted compositions to the output device 114 in block 218.

In block 220, the randomization engine 108 determines if a final composition selection is received. The user may utilize the input device 112 to select one of the adjusted compositions in the subsequent set as the final composition. If the randomization engine 108 receives a selection of the final composition, it outputs the final composition in block 222. If the randomization engine 108 does not receive a final composition selection, the process may return to block 212 and repeat until a final composition selection is received.

If the randomization engine 108 receives a selection of three or more adjusted compositions, the randomization engine 108 generates a subsequent set of adjusted compositions using a breeding at random method in block 224. The breeding at random method may include the randomization engine 108 using the randomness value to identify, at random, two of the three or more selected adjusted compositions from which to generate a subsequent adjusted composition. Once two adjusted compositions are identified, certain properties from each of the two identified adjusted compositions and the randomness value may be used to generate a subsequent adjusted composition to include in a subsequent set of adjusted compositions. The properties may include the selected properties. The randomization engine 108 may then identify another two of the three or more selected adjusted compositions from which to generate a subsequent adjusted composition to include in a subsequent set of adjusted compositions. This process may be repeated until a complete subsequent set of adjusted compositions is generated. The subsequent set of adjusted compositions includes adjusted compositions, each being generated from two of the three or more selected adjusted compositions that were identified randomly, selected properties and randomness value. After generating a complete subsequent set of adjusted compositions, the randomization engine 108 outputs the subsequent set of adjusted compositions in block 218.

The randomization engine 108 may then determine if a final composition selection is received in block 220. If received, the final composition is outputted in block 222 to an output device 114. If not received, the process may return to block 212 and repeat until a final composition selection is received.

If the randomization engine 108 receives a selection of two adjusted compositions, the randomization engine 108 generates a subsequent set of adjusted compositions using a breeding method in block 226. In some embodiments, the breeding method includes using the randomness value to randomly combining properties associated with each of the two selected adjusted compositions to generate each subsequent adjusted composition included in a subsequent set. For example, a color property may be used from a first selected adjusted composition and a shape property may be used from a second adjusted composition to generate the subsequent adjusted composition. In some embodiments of the present invention, the randomization engine 108 randomly modifies selected properties from each of the two selected adjusted compositions based on the randomness value to generate the subsequent adjusted composition. The selected properties may be the same properties selected in block 204 of FIG. 2. This process may be repeated until a complete subsequent set of adjusted compositions is generated. After generating a complete subsequent set of adjusted compositions, the randomization engine 108 outputs the subsequent set of adjusted compositions in block 218 to the output device 114.

The randomization engine 108 may then determine if a final composition selection is received in block 220. If received, the final composition is outputted in block 222 to the output device 114. If not received, the process may return to block 212 and repeat until a final composition selection is received.

If one adjusted composition is selected, the randomization engine 108 may determine if a final composition selection is received in block 228. For example, the user may utilize the input device 112 to identify the one adjusted composition that is selected as the final composition. If the final composition selection is received, the final composition is outputted in block 222 to the output device 114. If the final composition selection is not received, the randomization engine 108 generates a subsequent set of adjusted compositions using the selected adjusted composition in block 230.

The randomization engine 108 may utilize embodiments of the present invention to generate the subsequent set of adjusted compositions in block 230. For example, the randomization engine 108 may receive the adjusted composition that is selected and use it as a first composition to generate a subsequent set of adjusted compositions in accordance, for example, with the methods illustrated in FIG. 2 and FIG. 4. In some embodiments, the previously selected properties may be used to generate the subsequent set. In other embodiments, the randomization engine 108 may receive different selected properties and use the different selected properties to generate the subsequent set in accordance with the methods illustrated in FIG. 2 and FIG. 4.

In bock 218, the randomization engine 108 outputs the subsequent set of adjusted compositions to the output device 114. For example, the subsequent set of adjusted compositions may be displayed to the user via a graphical user interface included in the output device 114. The user may review the subsequent set of adjusted compositions using the output device 114.

In block 220, the randomization engine 108 determines if a final composition selection is received. For example, the randomization engine 108 may receive a selection identifying one of the adjusted compositions in the subsequent set as a final composition. If a final composition selection is received, the randomization engine 108 outputs the final composition in block 222 to the output device 114. If a final composition selection is not received, the process returns to block 212 and repeats. The process may repeat until a final composition is selected.

Illustrative Example of Generating an Adjusted Composition

Adjusted composition generation methods according to various embodiments of the present invention may be used to provide a user with a different composition variations of a first composition by modifying one or more properties associated with the first composition. An example of generating an adjusted composition is discussed below with reference to screen shots shown in FIGS. 5-11.

Figure 5:
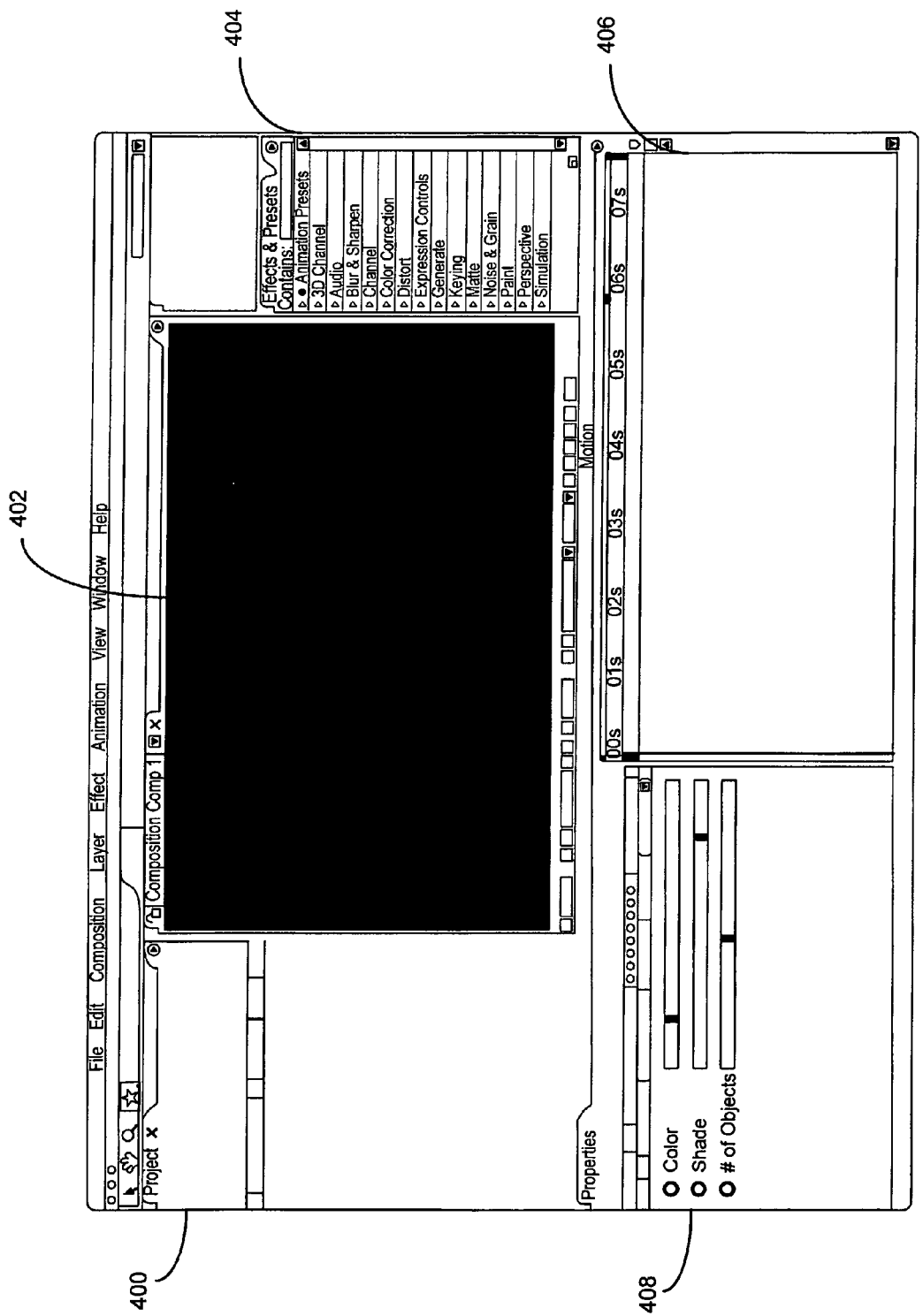
FIG. 5 is a screen shot of an application used to generate adjusted compositions according to one embodiment of the present invention.

FIG. 5 illustrates a screen shot of an open application on a graphical user interface of an output device such as a monitor. The application may be any application configured to allow edits to and creation of a composition, an example of which is After Effects from Adobe®. The application includes windows 400, 402, 404, 406, 408, which may display information to a user or display results of processing to the user. The windows include a project window 400 that may identify a name of a project on which the user is working. A composition window 402 is provided that displays a current composition on which the user may be working. An effects and presets window 404 is provided that allow users to select effects and cause the application to apply them to the composition. A motion window 406 is provided that allows users to select a speed of window movement. A properties window 408 is provided that lists any number of properties associated with the composition. For simplicity purposes, however, only the properties of color, shade, and number of objects are shown in properties window 408.

Figure 6:
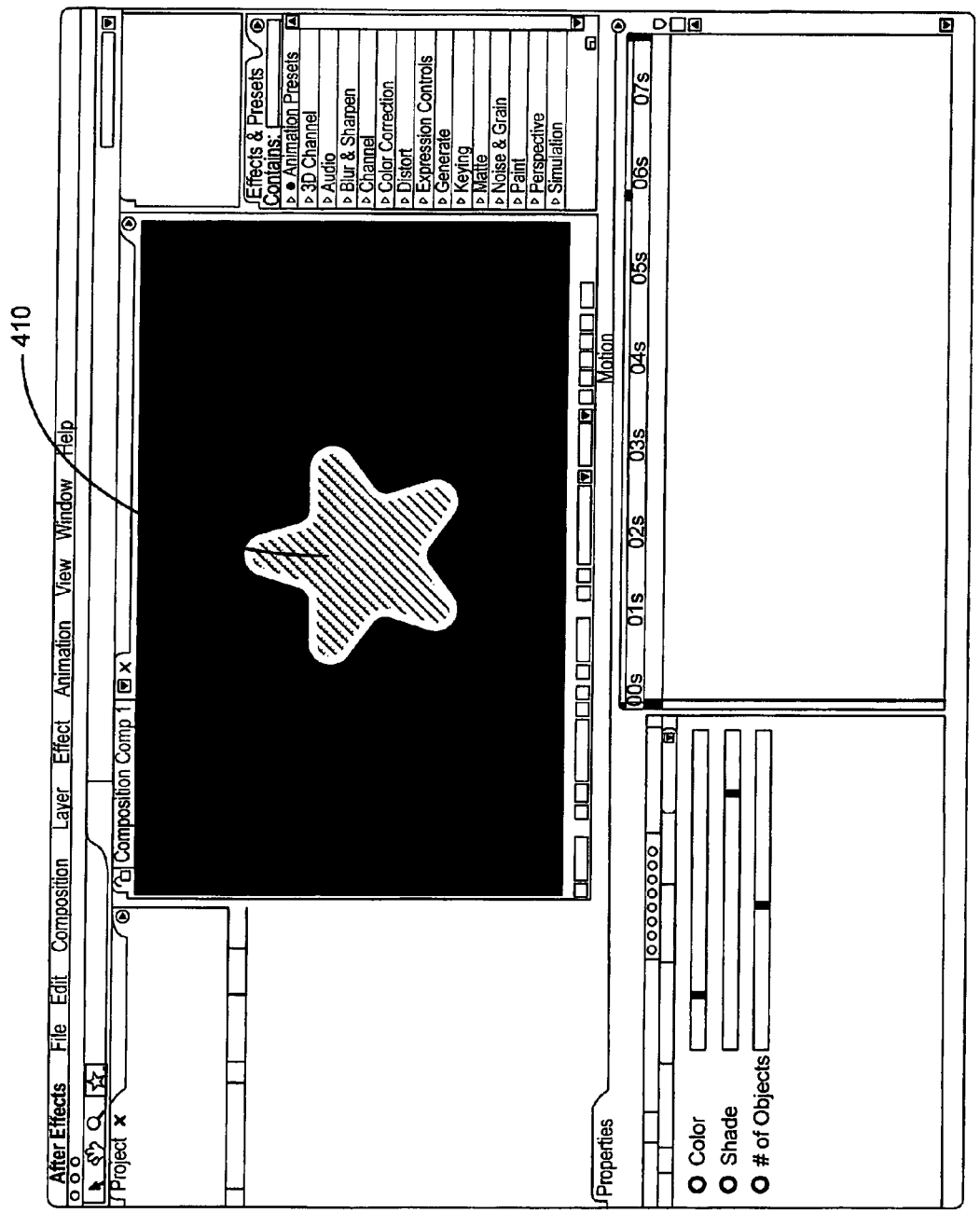
FIG. 6 is a screen shot of the application of FIG. 5 receiving a first composition according to one embodiment of the present invention.

FIG. 6 shows the application receiving a first composition 410. The first composition 410 is an illustration of a star-shaped object that includes pixels having properties. The first composition 410 may be received from any source. For example, the user may utilize the application to create the first composition 410. The application may also be used to open a file containing the first composition 410 that is stored in data storage or an external storage component. In some embodiments, the first composition is a keyframe selected, by the user or automatically, a composition that includes one or more keyframes and intervening frames. In some embodiments, the application may be used to access or download the first composition 410 over a network.

Figure 7:
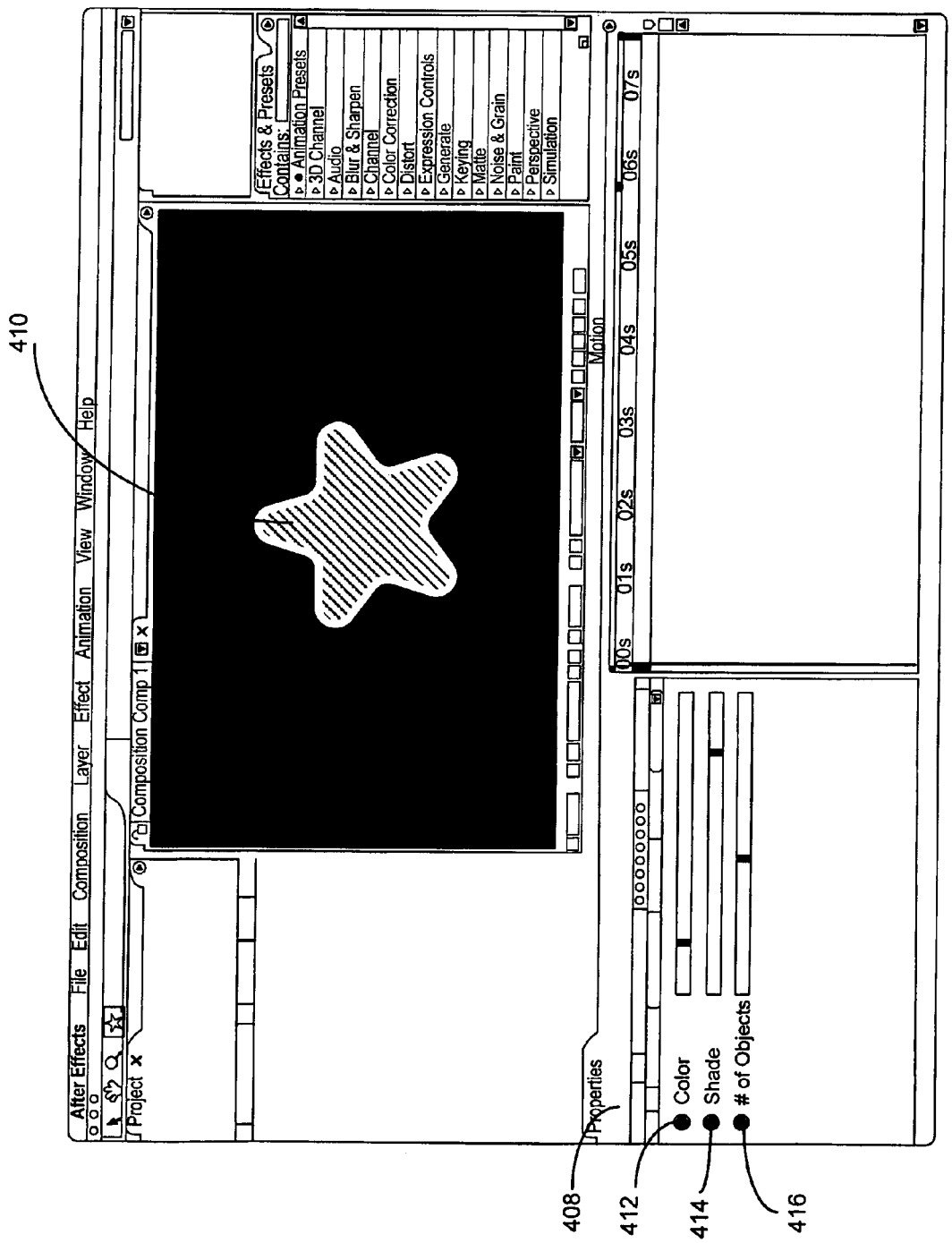
FIG. 7 is a screen shot of the application of FIG. 5 receiving a selection of properties according to one embodiment of the present invention.

FIG. 7 shows the application receiving a selection of properties listed in the properties window 408. The properties may be selected with a mouse selecting buttons 412, 414, 416 associated with each property. In some embodiments, the application may also receive a randomness value (not shown). In other embodiments, a default randomness value of a pre-set percentage, such as 100%, may be received.

Figure 8:
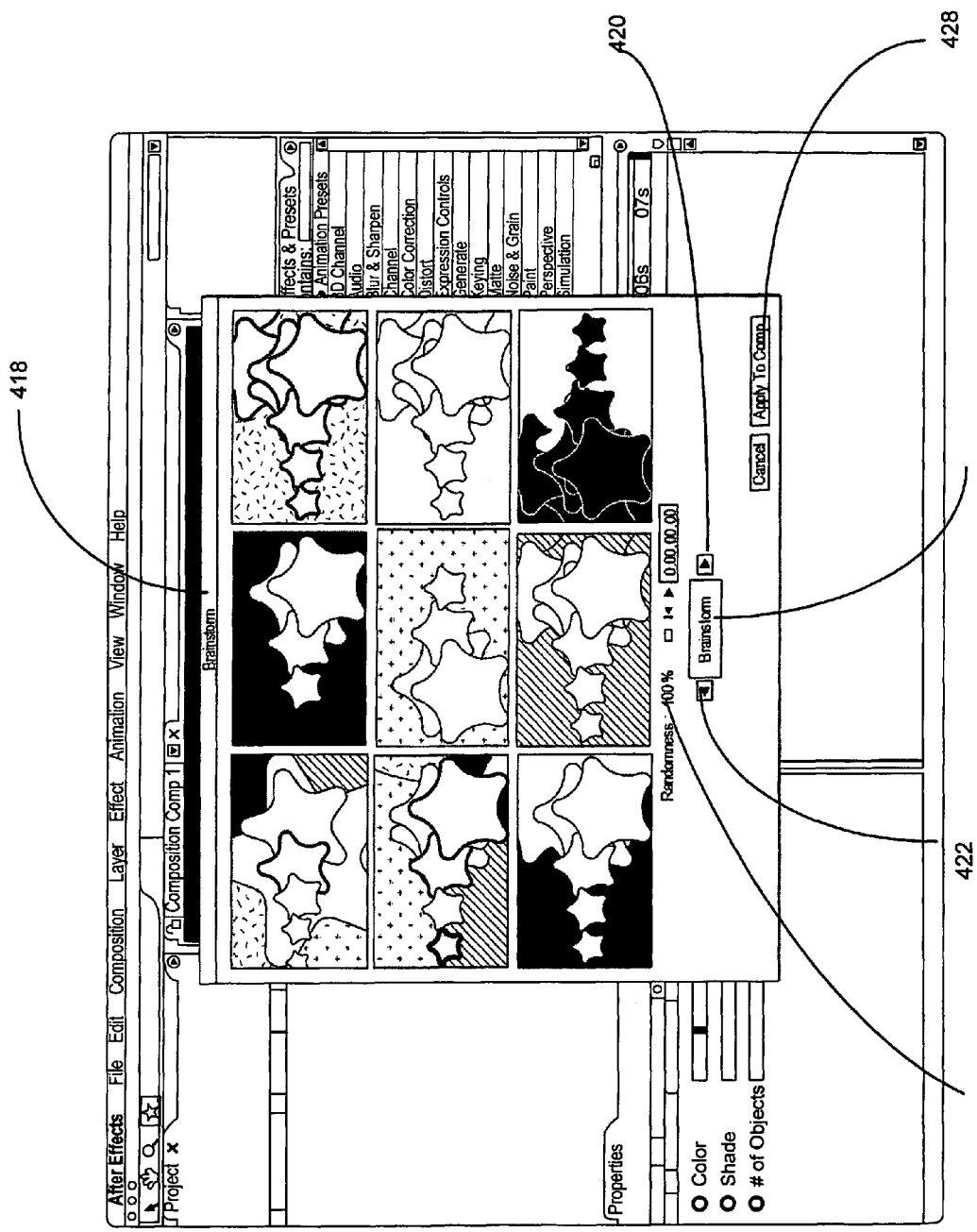
FIG. 8 is a screen shot of the application of FIG. 5 outputting a subset of adjusted compositions according to one embodiment of the present invention.

FIG. 8 shows a subset of adjusted compositions 418 that the application generated using a randomization engine. The subset of adjusted compositions 418 includes nine windows, each of which contain an adjusted composition. The randomization engine generates the set of adjusted compositions by using the randomness value to randomly modify the properties of the first composition selected in properties window 408. The subset of adjusted compositions 418 is displayed to the user for review. The user may cause the application to perform a number of additional composition processing options. The user can use arrows 420, 422 to display another subset of adjusted compositions within the set of adjusted compositions. The user can select a brainstorm button 424 to cause the randomization engine to generate another set of adjusted compositions using the same parameters. The user can change the randomness value by selecting and changing randomness value 426 to generate another set of adjusted compositions using a different randomness value.

In some embodiments, one or more of the adjusted compositions in the subset 418 may be a keyframe representing a composition having one or more frames in which the position of objects within each frame may change based on information within the frames providing the appearance of object movement. For example, the adjusted composition may be an animation or other type of visual presentation with one or more objects that appear to move. The one or more frames may be based on a first composition of an animation that includes multiple frames or generated using a first composition that is static and selected properties associated with object movement and/or keyframes. The one or more selected properties modified for the adjusted composition may be static over time, such as each frame including the same modified property values. In some embodiments, the one or more selected properties modified for the adjusted composition may change for each frame or a subset of frames over time. The frames may be viewed over time within the subset of adjusted composition 418 or maximized and viewed. For example, the user can select the adjusted composition and view the animation.

Figure 9:
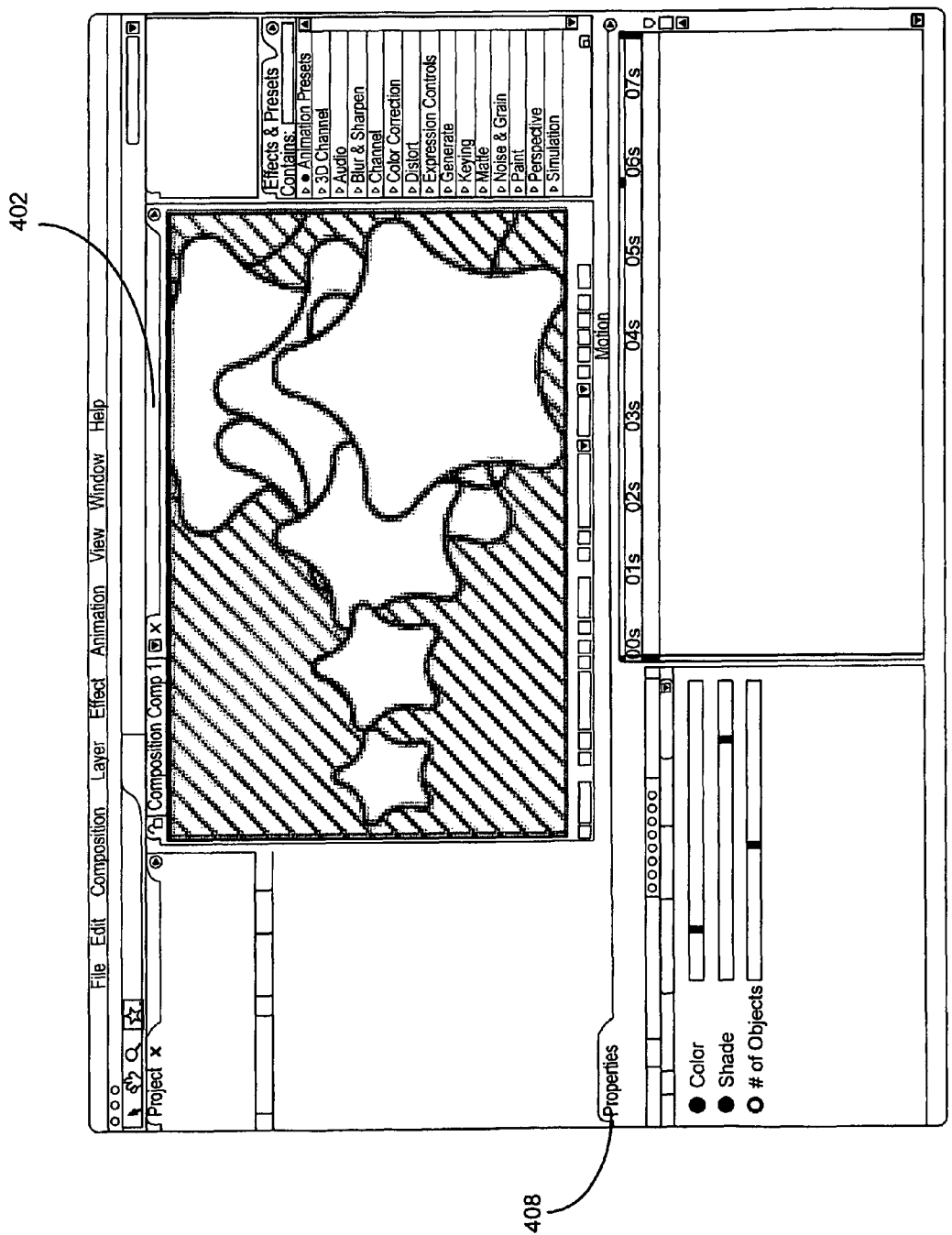
FIG. 9 is a screen shot of the application of FIG. 5 outputting a selected adjusted composition according to one embodiment of the present invention.
Figure 10:
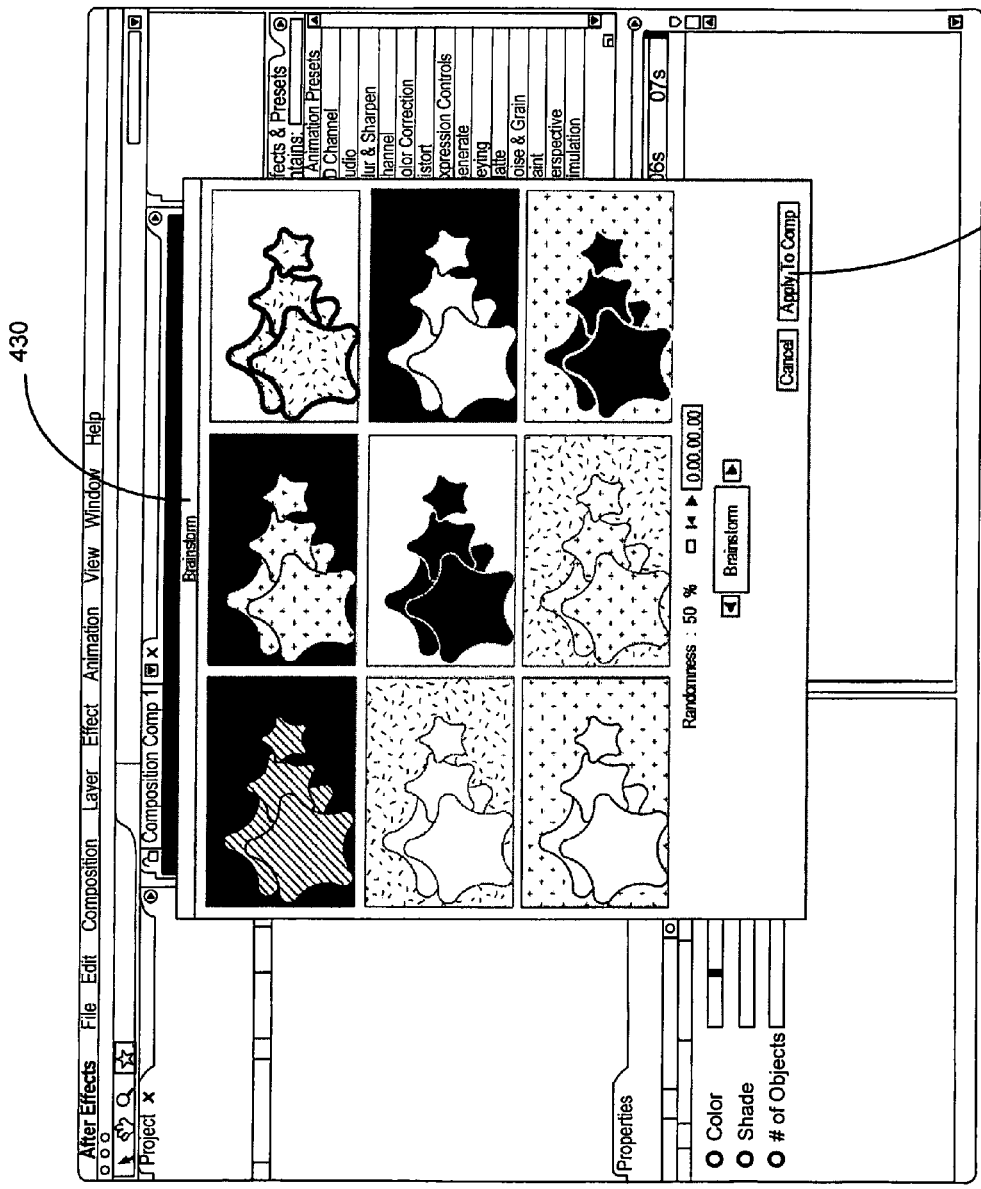
FIG. 10 is a screen shot of the application of FIG. 5 outputting a subsequent subset of adjusted compositions according to one embodiment of the present invention.

The user can select one or more of the displayed adjusted compositions by using a mouse to select the box containing the adjusted composition(s) the user wishes to select. If the user selects one adjusted composition, the user may then select the apply to comp button 428 causing the adjusted composition selected to be displayed in window 402 as shown in FIG. 9.

Figure 11:
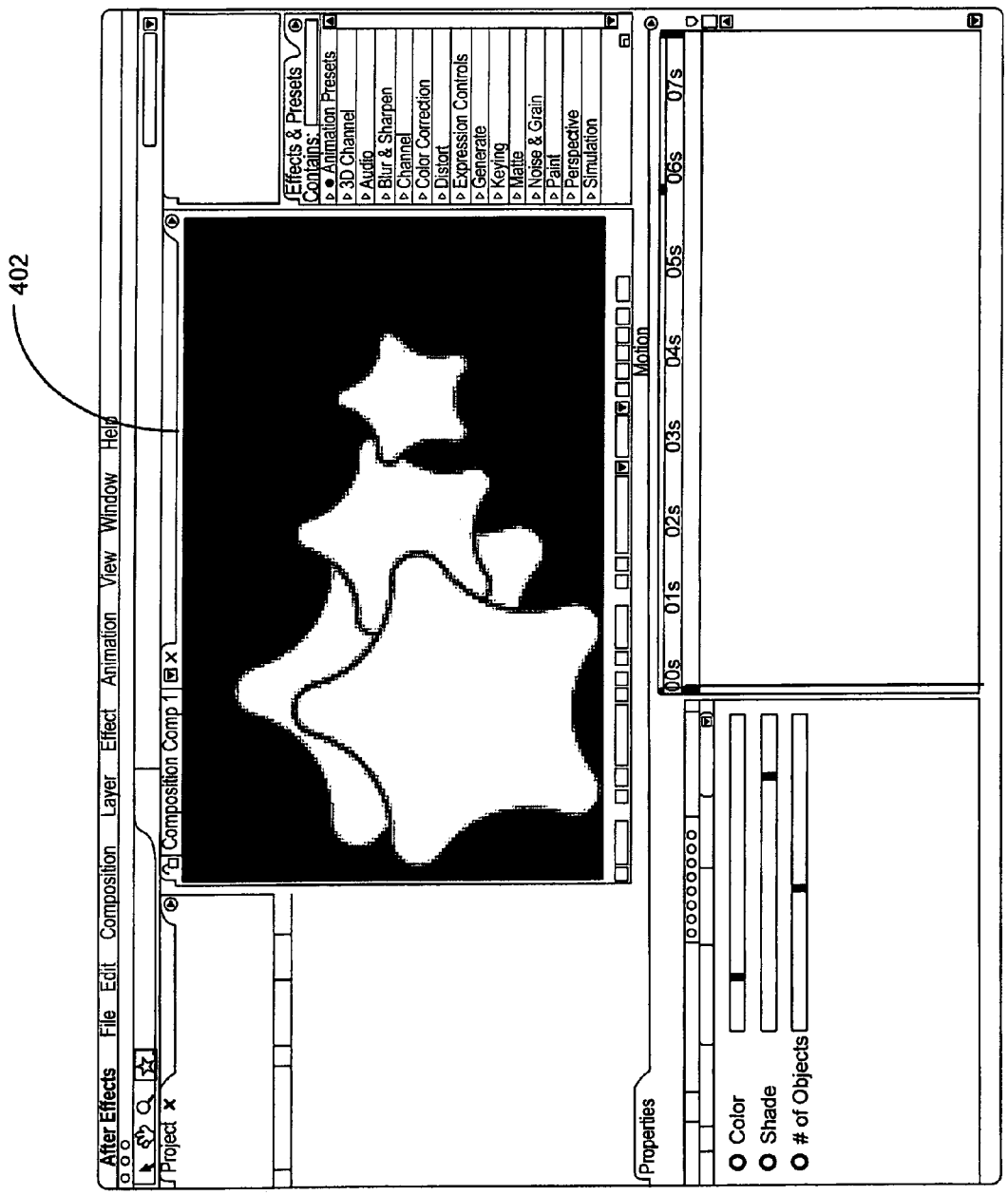
FIG. 11 is a screen shot of the application of FIG. 5 outputting a final composition according to one embodiment of the present invention.

The user may wish to generate additional adjusted compositions. The user can select properties in window 408 and, optionally, enter a randomness value, with which the randomization engine generates a subsequent set of adjusted compositions and display a subset 430 in FIG. 10. The randomization engine uses a randomness value of 50% and the selected properties to generate the subsequent subset of adjusted compositions 430 by modifying the selected composition shown in FIG. 9. The user may cause the application to perform a number of additional processing options. Examples of options include selecting one or more of the adjusted compositions to save for later use, selecting an adjusted composition and maximizing it to a larger size for inspection, selecting an adjusted composition and view frames included in the adjusted composition over time, returning to a previously generated subset of adjusted compositions, and selecting one or more of the adjusted compositions from which to generate a subsequent set of adjusted compositions. In some embodiments, adjusted compositions can be selected from multiple sets or subsets of adjusted compositions and used to generate a subsequent set of adjusted composition. An additional option may include selecting one composition and the apply to comp button 428 to cause the selected composition to be displayed in window 402 as shown in FIG. 11. The user may be satisfied with the adjusted composition and identify it as a final composition.

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

That which is claimed:

1. A method comprising:
receiving a first composition;
receiving a selection of one or more properties associated with the first composition;
receiving a randomness value;
generating, by a processor executing code stored on a computer-readable medium, a set of adjusted compositions based on at least (i) the first composition, (ii) selected one or more properties, and (iii) randomness value; and
outputting at least a subset of the set of adjusted compositions.

2. The method of claim 1, further comprising:
receiving a final composition selection; and
outputting the final composition.

3. The method of claim 1, further comprising:
receiving a selection of one adjusted composition;
generating a subsequent set of adjusted compositions using the one adjusted composition, selected properties, and randomness value; and
outputting at least a subset of the subsequent set of adjusted compositions.

4. The method of claim 1, further comprising:
receiving a selection of two adjusted compositions;
generating a subsequent set of adjusted compositions using breeding, wherein breeding comprises using the selected two adjusted compositions, selected one or more properties, and randomness value; and
outputting at least a subset of the subsequent set of adjusted compositions.

5. The method of claim 1, further comprising
receiving a selection of three or more adjusted compositions;
generating a subsequent set of adjusted compositions using breeding at random, wherein breeding at random comprises using the three or more adjusted compositions, selected one or more properties, and randomness value; and
outputting at least a subset of the subsequent set of adjusted compositions.

6. The method of claim 1, wherein receiving the selection of one or more properties comprises receiving a selection of one property; and
wherein generating the set of adjusted compositions comprises:
determining spread attributes of the one property;
identifying a plurality of property spread attributes based on the randomness value; and
generating the set of adjusted compositions using the identified plurality of property spread attributes.

7. The method of claim 1, wherein receiving the selection of one or more properties comprises receiving a selection of a plurality of properties; and
wherein generating the set of adjusted compositions comprises:
determining spread attributes for each selected property;
generating a random number between two boundaries for each selected property;
calculating a cubed result by taking a cube of each random number;
multiplying each cubed result by a mutation strength to generate a mutation variable for each cubed result, wherein the mutation strength is based in part on the randomness value;
generating a direction attribute at random;
generating a new property value corresponding to each selected property, wherein the new property value is based in part on the mutation variable and direction attribute;
generating a new composition by changing each of the selected plurality of properties with the a new property value corresponding to each plurality of properties; and
determining if the new composition completes an adjusted composition set.

8. The method of claim 1, wherein the subset of the set of adjusted compositions comprises a plurality of adjusted compositions; and
wherein at least one of the adjusted compositions comprises a keyframe and a plurality of frames.

9. The method of claim 1, wherein receiving the randomness value comprises automatically selecting a randomness value.

10. A computer-readable medium on which is program code, the computer-readable medium comprising:
program code for receiving a first composition;
program code for receiving a selection of one or more properties associated with the first composition;
program code for receiving a randomness value;
program code for generating a set of adjusted compositions based at least on the first composition, selected one or more properties, and randomness value; and
program code for displaying at least a subset of the set of adjusted compositions.

11. The computer-readable medium of claim 10, further comprising:
program code for receiving a final composition selection; and
program code for outputting the final composition.

12. The computer-readable medium of claim 10, further comprising:
program code for receiving a selection of an adjusted composition;
program code for generating a subsequent set of adjusted compositions using the adjusted composition, selected one or more properties, and randomness value; and
program code for outputting at least a subset of the subsequent set of adjusted compositions.

13. The computer-readable medium of claim 10, further comprising:
program code for receiving a selection of two adjusted compositions;
program code for generating a subsequent set of adjusted compositions using breeding, wherein breeding comprises using the two adjusted compositions, selected one or more properties, and randomness value; and
program code for outputting at least a subset of the subsequent set of adjusted compositions.

14. The computer-readable medium of claim 10, further comprising
program code for receiving a selection of three or more adjusted compositions;
program code for generating a subsequent set of adjusted compositions using breeding at random, wherein breeding at random comprises using the three or more adjusted compositions, selected one or more properties, and randomness value; and
program code for outputting at least a subset of the subsequent set of adjusted compositions.

15. The computer-readable medium of claim 10, wherein program code for receiving the selection of one or more properties comprises receiving a selection of one property; and
wherein program code for generating the set of adjusted compositions comprises:
program code for determining spread attributes of the one property;
program code for identifying a plurality of property spread attributes based on the randomness value; and
program code for generating the set of adjusted compositions using the identified plurality of property spread attributes.

16. The computer-readable medium of claim 10, wherein program code for receiving the selection of one or more properties comprises receiving a selection of a plurality of properties; and
wherein program code for generating the set of adjusted compositions comprises:
program code for determining spread attributes for each selected property;
program code for generating a random number between two boundaries for each selected property;
program code for calculating a cubed result by taking a cube of each random number;
program code for multiplying each cubed result by a mutation strength to generate a mutation variable for each cubed result, wherein the mutation strength is based in part on the randomness value;

program code for generating a direction attribute at random;

program code for generating a new property value corresponding to each selected property, wherein the new property value is based in part on the mutation variable and direction attribute;

program code for generating a new composition by changing each of the selected plurality of properties with the new property values corresponding to each selected plurality of properties; and program code for determining if the new composition completes an adjusted composition set.

17. The computer-readable medium of claim 10, wherein the subset of the set of adjusted compositions comprises a plurality of adjusted compositions; and wherein at least one of the adjusted compositions comprises a plurality of frames.

18. A system comprising:

an output device adapted to display a user interface;

an input device adapted to receive user inputs and provide the user inputs to a processor-based device, wherein the user inputs comprises a selection of one or more composition properties and a randomness value; and the processor-based device comprising an application having a randomization engine and a first composition, wherein the randomization engine is adapted to:

generate a set of adjusted compositions based at least on the first composition, selected properties, and the randomness value; and output at least a subset of the set of adjusted compositions to the output device.

19. The system of claim 18, wherein the randomization engine is further adapted to:

receive a final composition selection from the input device; and output the final composition to the output device.

20. The system of claim 18, wherein the randomization engine is further adapted to:

receive a selection of one adjusted composition from the input device;

generate a subsequent set of adjusted compositions using the one adjusted composition, selected one or more properties, and randomness value; and output at least a subset of the subsequent set of adjusted compositions to the output device.

21. The system of claim 18, wherein the randomization engine is further adapted to: receive a selection of two adjusted compositions from the input device;

generate a subsequent set of adjusted compositions using breeding by using the selected two adjusted compositions selected one or more properties, and randomness value; and output at least a subset of the subsequent set of adjusted compositions to the output device.

22. The system of claim 18, wherein the randomization engine is further adapted to:

receive a selection of three or more adjusted compositions from the input device;

generate a subsequent set of adjusted compositions using breeding at random by using the three or more adjusted compositions, selected one or more properties, and randomness value; and output at least a subset of the subsequent set of adjusted compositions to the output device.

23. The system of claim 18, wherein the selection of one or more composition properties comprises a selection of one property; and wherein the randomization engine generates the set of adjusted compositions by:

determining spread attributes of the one property;

identifying a plurality of property spread attributes based on the randomness value; and generating the set of adjusted compositions using the identified plurality of property spread attributes.

24. The system of claim 18, wherein the selection of one or more composition properties comprises a selection of a plurality of properties; and wherein the randomization engine generates the set of adjusted compositions by:

determining spread attributes for each selected property;

generating a random number between two boundaries for each selected property;

calculating a cubed result by taking a cube of each random number;

multiplying each cubed result by a mutation strength to generate a mutation variable for each cubed result, wherein the mutation strength is based in part on the randomness value;

generating a direction attribute at random;

generating a new property value corresponding to each selected property, wherein the new property value is based in part on the mutation variable and direction attribute;

generating a new composition by changing each of the selected plurality of properties with the new property values corresponding to each of the plurality of properties; and determining if the new composition completes an adjusted composition set.

25. The system of claim 18, wherein the subset of the set of adjusted compositions comprises a plurality of adjusted compositions; and wherein at least one of the adjusted compositions comprises a plurality of frames.

26. A method comprising:

receiving a first composition;

automatically identifying one or more properties associated with the first composition;

receiving a randomness value;

generating, by a processor executing code stored on a computer-readable medium, a set of adjusted compositions based on at least (i) the first composition, (ii) identified one or more properties, and (iii) randomness value; and outputting at least a subset of the set of adjusted compositions.

27. The method of claim 26, wherein receiving the randomness value comprises automatically selecting the randomness value.

* * * * *